(12) United States Patent
Abrahamson et al.

(10) Patent No.: US 6,222,481 B1
(45) Date of Patent: Apr. 24, 2001

(54) METHOD OF DETECTING AND CLASSIFYING OBJECTS BY MEANS OF RADAR

(75) Inventors: Staffan Abrahamson; Dan Axelsson; Bertil Brusmark; Anders Gustafsson, all of Linköping; Hans Strifors, Täby, all of (SE)

(73) Assignee: Forsvarets Forskningsanstalt, Stockholm (SE)

( * ) Notice: Subject to any disclaimer, the term of this patent is extended or adjusted under 35 U.S.C. 154(b) by 0 days.

(21) Appl. No.: 09/214,416

(22) PCT Filed: Jul. 4, 1997

(86) PCT No.: PCT/SE97/01224

§ 371 Date: Jan. 5, 1999

§ 102(e) Date: Jan. 5, 1999

(87) PCT Pub. No.: WO98/01770

PCT Pub. Date: Jan. 15, 1998

(30) Foreign Application Priority Data

Jul. 5, 1996 (SE) .................................... 9602657

(51) Int. Cl.[7] .............................. G01S 7/41; G01S 7/292
(52) U.S. Cl. ................. 342/90; 342/21; 342/22; 342/27; 342/89; 342/175; 342/189; 342/192; 342/195
(58) Field of Search ................. 342/27, 28, 89, 342/90, 175, 1, 189–197, 205, 21, 22, 159–164, 13; 324/323, 326–328; 89/1, 13

(56) References Cited

U.S. PATENT DOCUMENTS 2,624,871   1/1953   Meagher .
4,016,486 * 4/1977   Pecori ................................... 324/326
4,641,566 * 2/1987   Pomeroy ............................... 89/1.13
5,239,309 * 8/1993   Tang et al. ............................. 342/13
5,325,095   6/1994   Vadnais et al. ........................ 342/22
5,392,050   2/1995   Guerci et al. .......................... 342/90
5,481,269 * 1/1996   Imhoff et al. .......................... 342/90
5,497,158 * 3/1996   Schmid et al. ......................... 342/90
5,499,029   3/1996   Bashforth et al. ..................... 342/22
5,867,118 * 2/1999   McCoy et al. ......................... 342/90

OTHER PUBLICATIONS

International Conference on Ultra–Wideband, Short–Pulse . . . , vol., Apr. 1994, (Brooklyn, USA), H Ling et al, "Time Frequency Processing of Wideband Radar Echo: From Fixed Resolution to Multiresolution and Superresolution", p. 531, line 15—p. 533, line 19, figure 5, pp. 527–534.

* cited by examiner

Primary Examiner—Bernarr E. Gregory
(74) Attorney, Agent, or Firm—Jacobson, Price, Holman & Stern, PLLC

(57) ABSTRACT

The present invention relates to a method of detecting and classifying objects using radar. The method means that a broadband radar signal comprising wavelengths that coincide with characteristic lengths of targets to be detected and classified is transmitted. Further, a returned echo signal is received and analysed, at which a signal analysis in a combined time-frequency domain is used, which comprises determining characteristic frequencies in the signal return and their mutual time relations. Finally, a comparison with the corresponding stored values of an analysis of possible targets is performed.

16 Claims, 3 Drawing Sheets

*Pre-processing*

*Classification*

*Library*

*Pre-processing display*

*Classification*

METHOD OF DETECTING AND CLASSIFYING OBJECTS BY MEANS OF RADAR

BACKGROUND OF THE INVENTION

Field of the Invention

1. The present invention relates to a method of detecting and classifying objects using radar.

Description of the Related Art

2. There are large areas in Asia, Africa, and the Middle East covered with mines. At a rough estimate, 100 million mines are laid in more than 60 countries. Today there does not exist any technology capable of detecting these mines quickly and with large probability. As an example, it has been estimated that with the present pace of clearance 2500 years would be needed to clear Afghanistan of mines.

One problem is all metal fragments surrounding the mines in the ground. For each mine it finds, a metal detector on average also detects a thousand fragments. If the false alarm rate could be reduced to only a hundred per mine, the clearance pace would be increased ten times. Another problem is the non-metallic mines, which are very hard to detect using conventional techniques.

Earlier attempts at classifying detected targets using radar have been concentrated toward air targets. The predominant method has been to compare the amplitude of the returned echo signal for one or more polarizations. The method is aspect dependent, which involves large amounts of data with ensuing handling problems. Systems tend to be either unmanageable or capable of classifying only a small amount of targets or both.

SUMMARY OF THE INVENTION

The present invention solves the problem in question, viz., to be able to classify a large amount of different targets, independently of the aspect angle of the target by designing it as the corresponding stored values of an analysis of possible targets. Convenient realizations of the invention include basing the analysis on the first portion of the returned signal, including the specular reflex, as well as its later portion, including the returned radiation from creeping waves induced in the target and, where appropriate, reflexes from the interior of the target, such as its rear edge. In addition, captured signals may be amplified with increasing amplification according to the distance before they are analyzed, and mines buried in the ground or targets in the atmosphere may be chosen as intended targets.

BRIEF DESCRIPTION OF THE DRAWING

In the following the invention will be described referring to enclosed drawings, in which.

DETAILED DESCRIPTION OF THE PREFERRED EMBODIMENTS

Figure 1A:
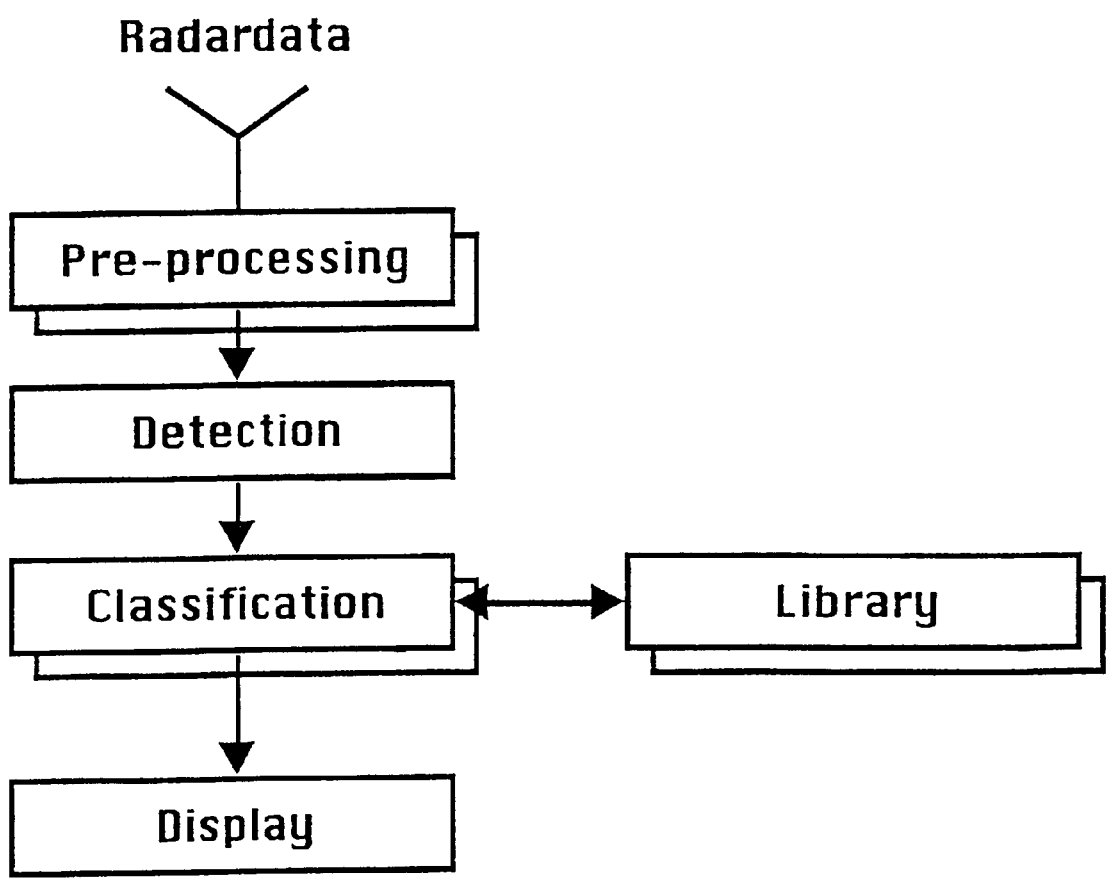
FIG. 1a shows a block conceptual diagram of detection and classification according to the invention.
Figure 1B:
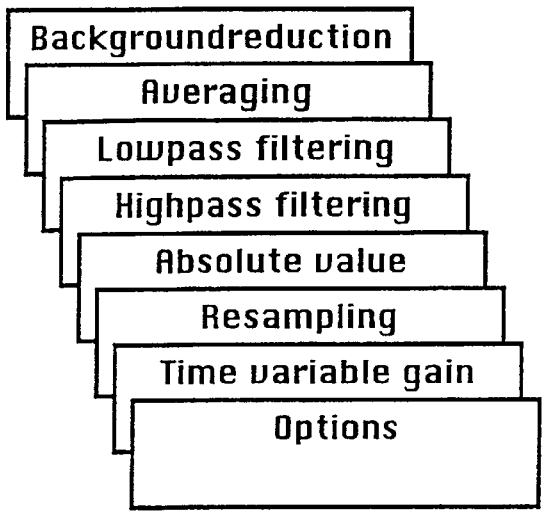
FIG. 1b shows examples of the contents of three of the blocks of FIG. 1a, and FIG. 2 shows a more detailed diagram of the data flow in a device according to the invention.
Figure 1B:
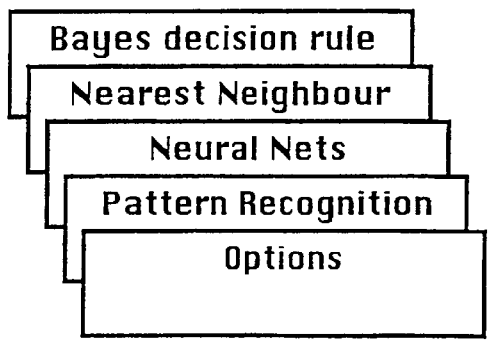
Figure 1B:
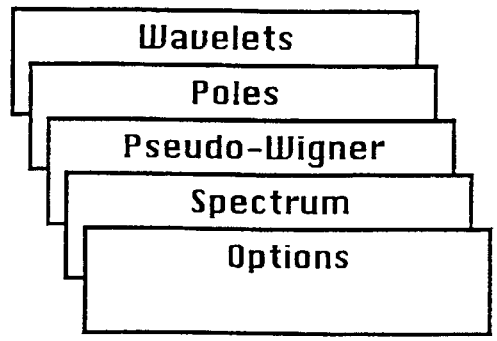

First, the theoretical background will be outlined. A radar pulse that is incident on a target interacts with the target, e.g., an aircraft or a mine buried in the ground. The returned pulse carries information about the target that can be used for target identification.

The target information inherent in the returned pulse is caused mainly of the following three effects:

1. Specular reflection from those boundary surfaces of the target that are facing the radar antenna. As a general rule, this is the most prominent contribution to the backscattered pulse. The size as well as the geometric shape of the target determines in general the waveform of the specular reflection (multiple reflection may also occur).

2. Creeping waves, or surface waves, are induced on the boundary surfaces of the target. These waves circumscribe the target as they continuously radiate off curved surfaces and edges. A portion of the radiated creeping waves is returned to the receiving antenna.

3. Internal reflections from i.a. the rear edge of the target, if the target (at least in part) is composed of dielectric material(s). In such case, a portion of the incident radar pulse penetrates these material(s) and conducted through the target i.a. to the rear edge.

The signature information in a radar return depends to a large extent on the frequency content of the transmitted radar pulse. Above all, the signature information depends on how the corresponding wavelengths are related to characteristic lengths of the target. Ideally, the incident waveform should contain wavelengths of the same order of magnitude as the characteristic lengths of the target. On that account, it is important that an ultra-wideband radar system is used. By using an impulse radar that transmits extremely short pulses (ns) or by using stepped frequencies for the transmitted pulse, the ultra-wideband is created.

The receiving antenna picks up the returned echo whose time-evolution is composed of the above-described components. For a given target, the returned wave-form evolves in time in a characteristic way, and, using suitable signal analysis, generates a signature of the target in the present aspect. For many targets, the aspect dependence of the computed signature is relatively small or varies in a manageable way with the aspect. This implies that only a small number of signature templates would be necessary for target identification.

An essential part of the invention is that the classification of targets is based on signal analysis in the combined time-frequency domain, at which characteristic frequencies together with their mutual relations in time are determined, which becomes input data for the classification. A suitably chosen time-frequency distribution (TFD) generates target signatures that are composed of distinguishing features in the two-dimensional time-frequency domain. The features generated by a TFD comprise more target-distinguishing features than do the features generated by standard Fourier transform technique. In particular, TFDs have proved advantageous for application to targets buried in the ground, where clutter from the ground above a buried target can be removed while keeping the target information.

When a signal is examined both the front portion of the returned waveform (the specular return) and the later portion (returned radiation from creeping waves) are used.

To give a clear idea of the inventive method, it will be presented in three steps using progressively more details. First as a block conceptual diagram in FIG. 1, then a diagram of the data flow is given in FIG. 2. In a third step a concrete example is given.

Large amounts of data are captured by the receiving system. To render target classification possible this amount must be reduced. This is carried out during the preprocessing. Extraneous data are removed and relevant data extracted. At the detection, objects are distinguished from ground-related data. The features of the objects are computed and compared with a reference library leading to a classification. The computer screen displays a depth view of the ground together with the detected objects and indications of their respective class belongings. The block conceptual diagram is displayed in FIG. 1a.

Figure 2:
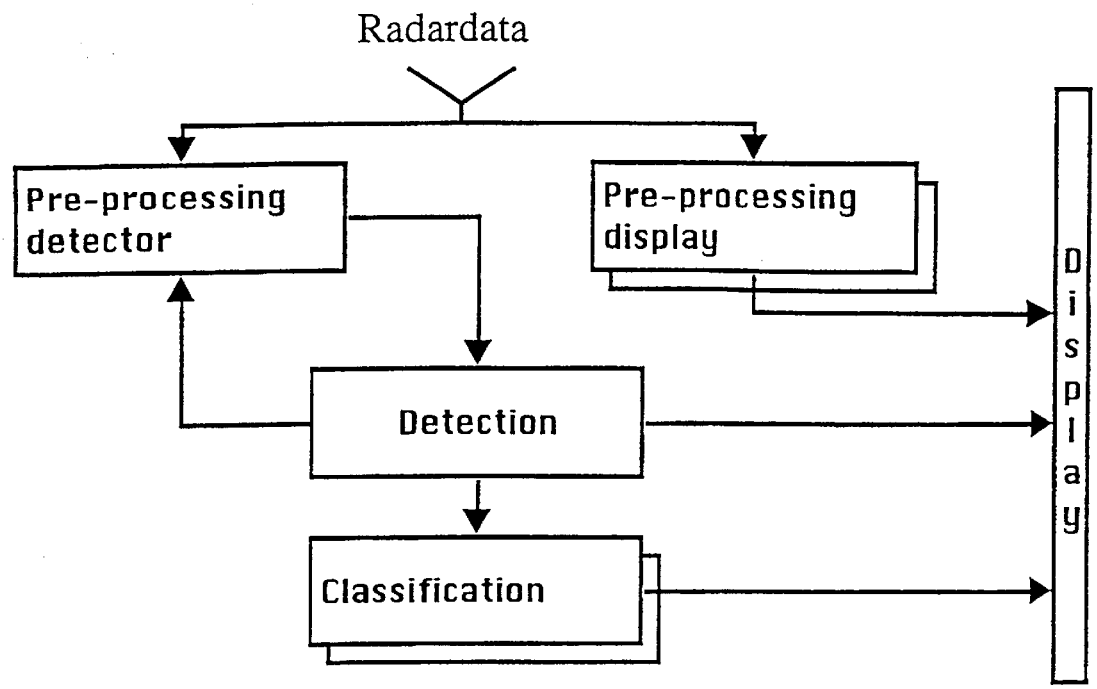
Figure 2:
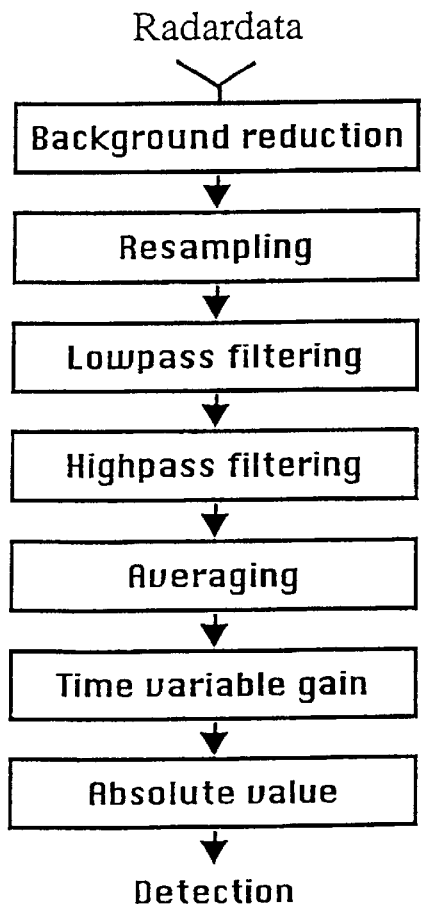
Figure 2:
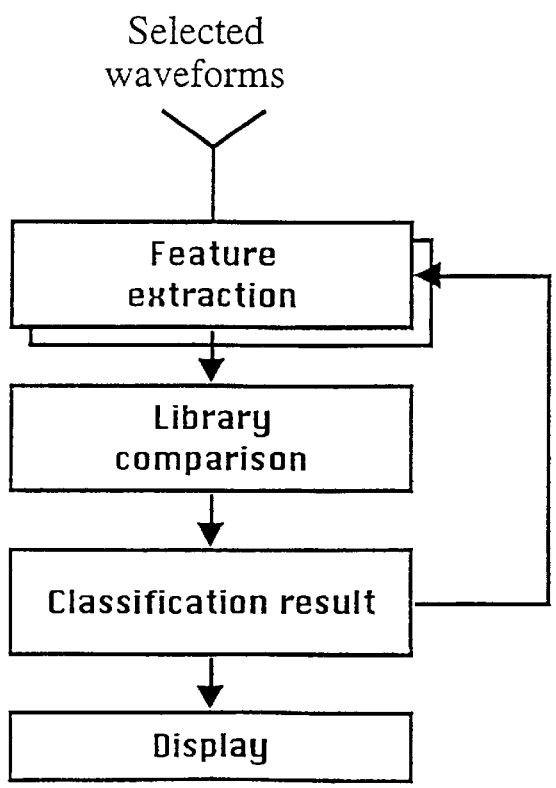

The data flow and a suitable implementation of its signal processing will now be outlined with reference to FIG. 2. As mentioned before, the captured data must be considerably reduced and pre-processed in several steps to generate an unambiguous picture on the screen and to render target classification possible. The pre-processing for the display is initiated by subtracting a representative background signal and enhancing the relevant part of the backscattered echo. This is reduced by resampling, using a lower sampling rate. Then the signal is lowpass filtered. A possible DC component in the signal is subtracted. To improve the signal-to-noise ratio, averaging is also performed. Targets buried to large depths return weak echoes, which can be enhanced using distance dependent amplification. Finally, the absolute value of the signal is computed and color-coded regarding signal amplitude. The processing is then finished and data are shown on the screen in desired mode.

Simultaneously with the screen processing, the signal is pre-processed for the detector. Its purpose is to bring out the object information from the background. From the returned echo signal a previously stored compound signal is subtracted whose individual components will compensate i.a. for system errors, surface and sub-surface echoes from the ground. Various detection methods are available. The most straightforward method uses a fixed threshold. If the maximum value of the signal exceeds the threshold value, detection of a target is declared. Another method is to use an envelope based on a representative background signal. Detection of a target is then declared when the captured signal anywhere extends outside the envelope. In this way, objects buried to large depths giving a weak signal amplitude can be more effortlessly detected. It is also possible to use an adaptive threshold that slowly adapts to the prevailing ground conditions while it is sensitive to swift changes in the various portions of the captured signals.

When a target has been detected, the corresponding data set is sent to the classification. Here the task is to obtain the unique parameters of the object in question. This is generally called feature extraction. The invention bases the classification on some significant combinations of points of time and frequencies as parameters. Wavelets and pseudo-Wigner distributions are examples of two TFD methods of signal processing.

Alternatively, the various components of returned radar echoes could be examined with respect to their different rates of damping, which depend on the material properties of the target. These damping rates can be utilized for classification.

Extracted features are subsequently compared with information stored in a reference library. The comparison can be performed in several ways. A well-known method is to use neural networks. Other methods are the nearest neighbour method, Bayes decision rule, and pattern recognition. Any one of these methods can provide a target classification with some likelihood.

The information is presented on a computer screen in various modes. It can change between raw data, detected objects, and classification results, or any combination of them.

In what follows, a particular example of the implementation of detection and classification is detailed. The impulse radar system is based on units manufactured by ERA Technology, England. The radar system is built on a transmitting unit and a receiving unit. The transmitter generates a very short pulse with a pulse repetition frequency of 200 kHz. The duration of the pulse is only 0.3 ns, which makes the required bandwidth possible. The transmitted peak power is 18 W. The antenna unit is equipped with two dipole antennas, one transmitting and one receiving, at right angles to each other. The radar system has a bandwidth of about 1.7 GHz (300 MHz–2 GHz). Sampling of signals is performed using a Tektronix TDS 820, which has an analog bandwidth of 6 GHz. The sampling frequency is 20 GHz, and the result is obtained with a signal level resolution of 14 bits. The sampling is controlled by a PC, which receives the data for storing, processing, and presentation.

For the screen presentation, the following data processing is performed. Each waveform is composed of 500 samples. The clutter level is reduced by subtracting from each captured waveform a previously stored waveform that consists of system errors and a ground-reflex reference. The waveform is filtered by mixing 25% of a new sample with 75% of the previously computed sample. The 500 samples are then reduced to 250 by keeping every other.

Subtracting the mean value of the 250 samples from each sample eliminates a possible DC level.

To smooth out the variations between the sampled waveforms and render the presentation unambiguous, a running averaging is performed. Each new waveform is weighted by 25% of the preceding averaged waveform.

Deeply buried objects give weak returned echo signals. They can be enhanced by applying a distance dependent amplification. This can be chosen as $$F = 1 + \frac{i-50}{200} * P,$$

where F is the amplification, i the number of samples (50–250), and the parameter P is in the interval (0–15).

For dry sand the value of P=12 gives the best result.

Subsequently, the absolute value of the waveform is computed to account appropriately for the negative samples. Finally, the signal amplitude of the waveform is colour-coded, which causes strong target echoes to stand out distinctly against the background. By preference, the result is presented as a depth-view of the ground.

At the same time as the above signal processing for the screen presentation runs, the processing for detection and classification is performed. Each waveform comprises 500 samples. To detect weak echoes a stored waveform consisting of system errors and a ground-reflex is subtracted from each captured waveform. The resulting waveform consists of noise and, possibly, an echo returned from an object.

The threshold level for the detector is determined by the maximum value of the last 20 samples of each waveform to which 8 is added, which brings the threshold level just above the noise level.

Of the 500 captured samples in the waveform, only the first 256 ones are subsequently used. The remaining samples are lowpass filtered using a Chebyshev filter of order 8. Afterwards, a down sampling from 256 to 128 samples is performed by keeping every other sample.

In case of detection of a target, the classification procedure is initiated. To enhance the likelihood of correct classification both time and frequency are taken into account. The classification is based on coefficients computed using Linear Phase Daubechies Wavelets. The algorithm performs time and frequency analysis of the waveform. Outputted data consist of 200 coefficients, which are compared with the reference library. Each object in the library is defined by 15 coefficients. Position and size of the coefficients are compared, and the least deviating sum of target coefficients and reference data coefficients determines the classification of the object, which is then displayed on the screen.

What is claimed is:

1. An essentially aspect independent method of detecting and classifying known and unknown targets using radar, comprising the steps of:

transmitting a wideband radar signal that includes wavelengths which coincide with characteristic overall lengths of targets to be detected and classified so as to obtain target signature information having limited aspect dependence;

receiving the radar signal as a returned signal;

detecting and determining characteristic frequencies in the returned signal as well as mutual time relations of said characteristic frequencies;

storing a plurality of values for characteristic frequencies and corresponding mutual time relations for a plurality of known targets in an analyzer; and analyzing the characteristic frequencies and mutual time relations in the returned signal by comparing the returned signal characteristic frequencies and mutual time relations with the stored characteristic frequencies and mutual time relations values of known targets to identify the unknown target.

2. The method according to claim 1, wherein returned signals are amplified with higher amplification for signals that have traveled a greater distance than for signals that have traveled a shorter distance.

3. The method according to claim 1, wherein the step of analyzing includes consideration of a first portion of the returned signal, including specular reflection, and a later portion of the returned signal, including returned radiation from surface waves induced in the target.

4. The method according to claim 3, wherein the target is composed of dielectric material and the analysis is further based on reflexes from an interior of the target.

5. The method according to claim 4, wherein the interior of the target includes a rear edge of the target.

6. The method according to claim 3, wherein the step of analyzing includes consideration of reflexes from an interior of the target when the target is of dielectric material.

7. The method according to claim 6, wherein the interior of the target includes a rear edge of the target.

8. The method as set forth in claim 1, wherein the targets to be detected include an aircraft and the wideband radar signal includes a frequency having a wavelength corresponding to a characteristic length of said aircraft.

9. The method as set forth in claim 1, wherein the targets to be detected include a buried mine and the wideband radar signal includes a frequency having a wavelength corresponding to a characteristic length of said buried mine.

10. The method as set forth in claim 1, wherein the wideband radar signal has a bandwidth of approximately 300 MHz to 2 GHz.

11. An essentially aspect-independent method of detecting and classifying a target using radar comprising:

transmitting a wideband radar signal that includes wavelengths which coincide with characteristic lengths of targets to be detected and classified;

receiving a returned radar signal containing specular reflection from target boundary surfaces facing the transmitted radar signal, and surface waves induced on the boundary surfaces which circumscribe the target;

detecting frequencies and mutual time relations in the returned radar signal; and analyzing and identifying the target by comparing the detected frequencies and mutual time relations with stored values for characteristic frequencies and corresponding mutual time relations for a plurality of known targets.

12. The method according to claim 11, wherein buried ground mines are chosen as intended targets.

13. The method according to claim 11, wherein targets in earth's atmosphere are chosen as intended targets.

14. The method according to claim 11, wherein the step of analyzing includes consideration of a first portion of the received radar signal, including specular reflection, and a later portion of the received signal, including returned radiation from surface waves induced in the target.

15. The method according to claim 14, wherein the step of analyzing includes consideration of reflexes from an interior of the target when the target is of dielectric material.

16. The method according to claim 15, wherein interior of the target includes a rear edge of the target.

* * * * *